United States Patent
Yeh et al.

(10) Patent No.: US 6,709,507 B2
(45) Date of Patent: Mar. 23, 2004

(54) METHOD OF PRODUCING STABILIZED ORGANIC PIGMENT PARTICLES AND DEVICE THEREFOR

(75) Inventors: An-Gong Yeh, Broomall, PA (US); Sandra L. Witman, Wilmington, DE (US); James L. Hohman, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/226,898

(22) Filed: Aug. 23, 2002

(65) Prior Publication Data

US 2003/0077446 A1 Apr. 24, 2003

Related U.S. Application Data

(60) Provisional application No. 60/314,337, filed on Aug. 23, 2001.

(51) Int. Cl.$^7$ .............................................. C09B 67/00
(52) U.S. Cl. ................. 106/493; 106/31.6; 106/412; 106/494; 106/495; 106/496; 106/497; 106/498; 366/101
(58) Field of Search ................. 106/412, 493, 106/494, 495, 496, 497, 498, 31.6, 31.69, 31.78, 31.9; 366/101

(56) References Cited

U.S. PATENT DOCUMENTS

| | | | |
|---|---|---|---|
| 3,157,659 A | 11/1964 | Werner et al. | |
| 3,256,285 A | 6/1966 | Fuchs et al. | |
| 3,257,405 A | 6/1966 | Gerson et al. | |
| 3,317,539 A | 5/1967 | Jeffe et al. | |
| 4,158,572 A | 6/1979 | Blackburn et al. | |
| 4,257,951 A | 3/1981 | Matrick | |
| 4,478,643 A | 10/1984 | Kuwahara et al. | |
| 4,685,419 A | 8/1987 | Nakajima | |
| 5,175,282 A | 12/1992 | Roth et al. | |
| 5,278,384 A | * 1/1994 | Matsuzawa et al. | ... 219/121.36 |
| 5,296,523 A | 3/1994 | Kobayashi et al. | |
| 5,340,618 A | 8/1994 | Tanisaki et al. | |
| 5,620,743 A | 4/1997 | Harth et al. | |
| 6,136,286 A | 10/2000 | Okuyama et al. | |
| 6,156,114 A | 12/2000 | Bell et al. | |
| 6,383,301 B1 | * 5/2002 | Bell et al. | ................. 118/716 |

FOREIGN PATENT DOCUMENTS

| | | |
|---|---|---|
| DE | 19511240 | 10/1995 |
| EP | 0655516 A1 | 5/1995 |
| EP | 1059337 A1 | 12/2000 |
| GB | 1502884 | 3/1978 |
| WO | WO 9729156 | 8/1997 |
| WO | WO 0052102 | 9/2000 |

OTHER PUBLICATIONS

M. A. Perkins, "Six–membered Heterocyclic Vat Dyes Pyridines and Pyridones" in The Chemistry of Synthetic Dyes and Pigments, American Chemical Society Monograph Series, 1955, pp. 481–482, (no month).

M. S. Whelen, "Anthraquinoneazines" In The Chemistry of Synthetic Dyes & Pigments, American Chemical Society Monograph Series, 1955, pp. 512–522, (no month).

Bigelow et al., "Phthalocyanine Pigments" in The Chemistry of Synthetic Dyes & Pigments, American Chemical Society Monograph Series, 1955, pp. 584–587, (no month).

S. S. Labana. 1967, Quinacridones, Chemical Review, 67, No. 1, pp 1–18, (no month).

H. Zollinger, 1991, Color Chemistry, Synthesis, Properties & Applications of Organic Dyes & Pigments, Principles of Preparation, pp. 101–104, (no month).

H. Zollinger, 1991, Color Chemistry, , Syntheses, Properties & Applications of Organic Dyes & Pigments, Higher Anellated Vat Dyes, pp. 219–220, (no month).

H. Zollinger, 1991, Color Chemistry, Properties & Applications of Organic Dyes & Pigments, Higher Anellated Vat Dyes, pp. 227–228, (no month).

H. Zollinger, 1991, Color Chemistry, Synthesis, Properties & Applications of Organic Dyes & Pigments, Carbonyl Pigments, pp. 236–237, (no month).

H. Zollinger, 1991, Color Chemistry, Syntheses, Properties & Applications of Organic Dyes & Pigments, Physical Conditioning of Pigments, pp. 296–298, (no month).

JP–3–090334, Abstract, Nippon Paint Co., Ltd, Apr. 16, 1991, Powdery Material Surface Treatment—by applying voltage to gas, containing activated gas with powdery material in fluidising tank etc.

(List continued on next page.)

Primary Examiner—Anthony J. Green
(74) Attorney, Agent, or Firm—Sudhir G. Deshmukh

(57) ABSTRACT

A method of producing self dispersible organic pigment particles stabilized by the method. The method includes modifying organic pigment particles and then contacting the surface modified particles with an aqueous vapor entrained in a carrier gas to produce the stabilized organic pigment particles. Typically the pigment particles are modified by exposing their surfaces to ozone or a plasma-activated process gas. The surface stabilizing method prevents the violent exothermic reaction, which occurs when surface modified pigment particles are exposed to ambient air. The method is accomplished in a device, which includes a reactor, means for introducing in the reactor aqueous vapor entrained in a carrier gas and an agitator assembly for deagglomerating during surface modification the pigment particles placed in the reactor. The stabilized particles of the present invention are also well suited for use in ink jet inks, pigmented waterborne and solvent borne coating compositions, and pigmented powder coating compositions.

13 Claims, 3 Drawing Sheets

OTHER PUBLICATIONS

W. Herbst et al., 1993, Industrial Organic Pigments, Production, Properties, Applications, Inc., pp. 9, (no month).

W. Herbst and K. Hunger, 1993, Industrial Organic Pigments, Production, Properties, Applications, pp. 398–415, (no month).

W. Herbst and K. Hunger, 1993, Industrial Organic Pigments, Production, Properties, Applications, pp. 418–427, (no month).

W. Herbst and K. Hunger, 1993, Industrial Organic Pigments, Production, Properties, Applications, pp. 467–475, (no month).

W. Herbst and K. Hunger, 1993 Industrial Organic Pigments, Production, Properties, Applications, pp. 498–503, (no month).

Copy of the International Search Report International Application No. PCT/US02/26873, Aug. 23, 2002.

* cited by examiner

METHOD OF PRODUCING STABILIZED ORGANIC PIGMENT PARTICLES AND DEVICE THEREFOR

CROSS REFERENCE TO RELATED APPLICATION

This application claims priority under 35 U.S.C. §119 from U.S. Provisional Application Ser. No. 60/314,337 (filed Aug. 23, 2001), which is incorporated by reference herein for all purposes as if fully set forth.

FIELD OF THE INVENTION

The present invention is directed to a method of stabilizing organic pigment particles, which had been previously surface modified, typically by exposure to plasma-activated process gases.

BACKGROUND OF THE INVENTION

Due to the hydrophobic nature of organic pigment particles, it is difficult to disperse them in compositions, such as coating compositions or inks, such as ink jet inks. It has been known that pigment particle surfaces can be modified to increase their self-dispersibility in water or solvent borne compositions. One of the methods used for pigment surface modification is to add a surface modifier, either an ionic or non-ionic surfactant, such as an acid or glycol containing polymer, which permits the pigment to be fully dispersed in a composition. Another method used for pigment surface modification is to expose the pigment particles to ozone or plasma-activated process gases. One problem associated with plasma activated surface modification is that it results in creating highly exothermic sites on the surface of pigment particles that tend to rapidly react upon exposure to ambient air. As a result, it becomes unsafe to handle these highly exothermic surface modified pigment particles. Moreover, self-dispersibility of these highly exothermic pigments tends to suffer once the pigment has undergone the exothermic event.

The present invention solves the problem of unsafe, difficult to handle pigment particles that have been surface modified by exposure to ozone or the plasma activated gases.

THE STATEMENT OF THE INVENTION

The present invention is directed to a method of producing stabilized organic pigment particles, said method comprising:
surface modifying organic pigment particles;
contacting said surface modified particles with an aqueous vapor entrained in a carrier gas to produce said stabilized organic pigment particles.

The present invention is also directed to a device for producing stabilized organic pigment particles comprising:
a reactor,
means for introducing in said reactor aqueous vapor entrained in a carrier gas; and
an agitator assembly for deagglomerating said pigment particles placed in said reactor.

DETAILED DESCRIPTION OF THE PREFERRED EMBODIMENT

Figure 1:
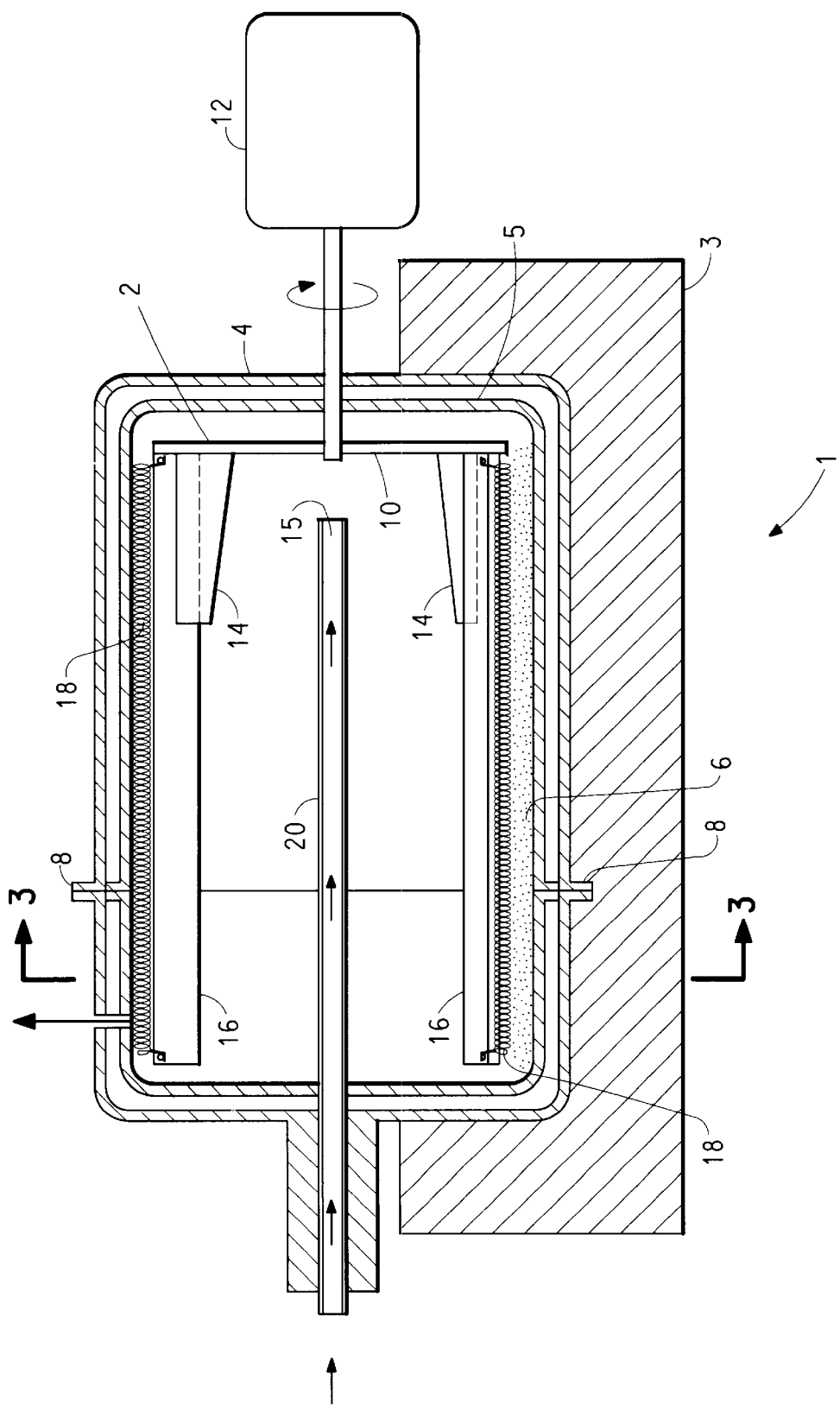
FIG. 1 is a view of reactor assembly used in the process of the present invention.

The process of the present invention stabilizes the surfaces of organic pigment particles that had been previously modified by plasma activated process gas. The process of surface modification generally involves creating sites or functionalities on pigment particle surfaces that render the pigment particles dispersible in solvent or aqueous medium used in the process of the present invention. Thus, for waterborne pigment dispersions these sites or functionalities typically include hydrophilic functional groups such as nonionic, anionic and cationic groups. In particular, a carboxylic group, hydroxyl group, sulfonic acid group or phosphoric acid group may be preferably used either singly or in combinations of thereof. Among these, a carboxylic group alone or a combination of a carboxylic group with one or more of the above groups is more preferable. When the pigment particle has a carboxylic group, sulfonic acid group or phosphoric acid group, each of these groups may be used in the acidic state as it is. However, it can be advantageous and desirable that a part or all of the acid form a salt to improve the dispersibility.

The processes for modifying pigment surfaces are known in the art. For example, the commonly assigned U.S. Pat. No. 6,156,114 (DuPont) discloses such a method. Some of the suitable process gases include oxygen, nitrogen, water vapor, hydrogen peroxide, carbon dioxide, ammonia, ozone, carbon monoxide, trimethylsilane, tetraetoxysilane, hexamethyldisilazane, ethylene diamine, maleic anhydride, arylamine, acetylene, methane, ethylene oxide, hydrogen, styrene, air, sulfur dioxide, sulfonyl precursors, phosphonyl precursors, alcohols, or a mixture thereof.

The aforedescribed process gas is activated by exposure to plasma generated by various known devices, such as plasma generators, corona discharge devices, which are described in U.S. Pat. Nos. 4,478,643 (Nippon Paint), 5,340,618 (Kimoto Co., Ltd.), and 5,620,743(BASF). The plasma activation can take place under subatmospheric or at atmospheric pressure.

Frequently, these methods involve, deagglomerating the pigment particles prior to their exposure to the plasma activated process gas so that substantially entire surface of the pigment particle is exposed the plasma activated process gas. For example, U.S. Pat. No. 6,156,114 (DuPont) describes the use ultrasonic deagglomerator for deagglomerating pigment particles before exposing the pigment particles to the plasma activated process.

Generally, the organic pigment particles are generally deagglomerated before or during surface modification by the plasma activated process gas or ozone.

Some of the organic particles suitable for the process of the present invention include carbon black, diketopyrrolopyrrole red pigment, perylene maroon pigment, polybutadiene, polychloroprene, polyethylene, polypropylene, polyacrylonitirle, polymethacrylic acid, polyvinyl acetate, polyvinyl chloride, cellulose, copper phthalocyanine, blue pigment 15:2, polychloro copper, phthalocyanine C.I., pigment green 7, quinacridone red pigment, quinacridone violet, or copper phthalocyanine blue.

The surfaces of the particles modified by the aforedescribed process can be highly reactive, which when exposed to ambient air can result in a violent exothermic reaction. Thus, it becomes quite unsafe to handle these highly exothermic particles. The present process eliminates this safety problem by stabilizing the reactive sites on the surfaces of these modified pigment particles.

A device suitable for stabilizing the modified pigment particles is shown in FIGS. 1, 2, 3 and 4. A reactor assembly 1 of the device includes a stationary chamber 4 positioned substantially horizontally and supported on a supporting block 3. Chamber 4 is preferably sealed. Chamber 4 is preferably cylindrical and can be made of suitable materials, such as glass or stainless steel. A cylindrical reactor 5 is coaxially positioned inside chamber 4 to retain pigment particles 6, which had been previously modified by the process described earlier. Reactor 5 is made of suitable inert material, such as glass or stainless steel. Chamber 4 is preferably split along a sealable flange 8 to permit positioning reactor 5 inside chamber 4 as well as to permit easy access and assembly.

Means for introducing in reactor 5 aqueous vapor entrained in a carrier gas preferably include a tubular lance 20 is positioned substantially along the axis of reactor 5 to introduce into reactor 5 aqueous vapor entrained in the carrier gas through an opening 15, preferably positioned distally from an exhaust end of chamber 4 to increase the dwell time of the aqueous vapor within reactor 5. Suitable carrier gases include argon, nitrogen, helium, neon, carbon dioxide, air or a mixture thereof. The carrier gas supplied from a carrier gas supply 22 is conveyed through a pressure regulator 24 to a vaporizer 26 containing an aqueous medium. A bubbler tube 25 entrains the aqueous vapor, which is regulated through a regulator valve 28 and then conveyed into reactor 5 via opening 15 of lance 20. Suitable aqueous medium includes water, preferably deionized or, if desired, water dissolved therein a suitable miscible solvent, such as alcohol.

A thermometer 30 and a pressure gauge 32 monitor the carrier gas containing the aqueous vapor exhausted from chamber 4. The carrier gas can then be exhausted, or preferably reused by passing through a desiccating canister 34 and then conveyed back to the carrier gas line entering chamber 4.

To uniformly expose surfaces of the modified particles in reactor 5, an agitator assembly 2 is used. Assembly 2 includes a flange 10 rotatably mounted inside reactor 5. A motor assembly 12 drives flange 10. A plurality of vane supports 14 is affixed to flange 10. Three radially equidistantly positioned vane supports 14 are preferred. Each vane support 14 is provided with a vane 16 that generally runs close to the inner wall of reactor 5 substantially across the entire length of reactor 5. Flange 10; vane support 14 and vane 16 are generally made of suitable inert and rigid material, such as aluminum or stainless steel. A flexible coil 18 running substantially along the length of vane 16 is preferably attached at the either ends of vane 16. Coil 18 stays in physical contact with the inner wall of reactor 5 as motor assembly 12 provides rotation to flange 10. As a result, any pigment particles sticking to the inner wall of reactor 5 are scraped off by coil 18 as it rotates inside reactor 5. Another advantage of the shape of coil 18 is that it simultaneously aids in deagglomerating any agglomerated pigment particles as it rotates inside reactor 5. Coil 18 is generally made of suitable inert and flexible material, such as stainless steel. Still another advantage of using coil 18 is that it prevents pockets of unmodified pigment on the inner surface of reactor 5, which can otherwise exist if reactor 5 does not have a substantially cylindrical shape. Coil 18 can expand or contract as it rubs against an even inner surface of reactor 5.

In operation, reactor 5 is loaded with the modified pigment particles and sealed sufficiently to prevent contact with air. The rotation of flange 10 is adjusted to sufficiently scrape the particles from the bottom and deagglomerate them to maximize their contact with the aqueous vapor. Generally, the RPM of flange 10 employed depends upon such factors as the type of pigment being stabilized, the amount of loading of the pigment in reactor 5. Rotation of the flange 10 is generally adjusted in the range of about 1 RPM to 500 RPM, preferably from 5 to 300 and more preferably from 10 to 240 RPM. Depending upon the type of organic pigment being stabilized, the amount of pigment loading in reactor 5 and depending upon the ultimate use, the amount of the aqueous vapor conveyed into reactor 5 and the dwell time of the pigment in reactor 5 are suitably adjusted. Generally, the weight of the aqueous vapor entrained in the carrier gas ranges from about 10 micrograms to 500 micrograms, preferably from about 50 micrograms to 500 micrograms, more preferably from about 100 micrograms to 500 micrograms, all per square meter of pigment surface area.

Reactor 5 can additionally be used for modifying the surfaces of pigment particles, prior to the stabilization process described above by providing reactor 5 with means for supplying ozone to reactor 5. The ambient or elevated pressure process uses a dielectric barrier discharge to generate oxygen plasma (atomic) utilizing air as a feed gas. Atomic oxygen combines with molecular oxygen to form stable ozone as an oxidizing agent.

Figure 2:
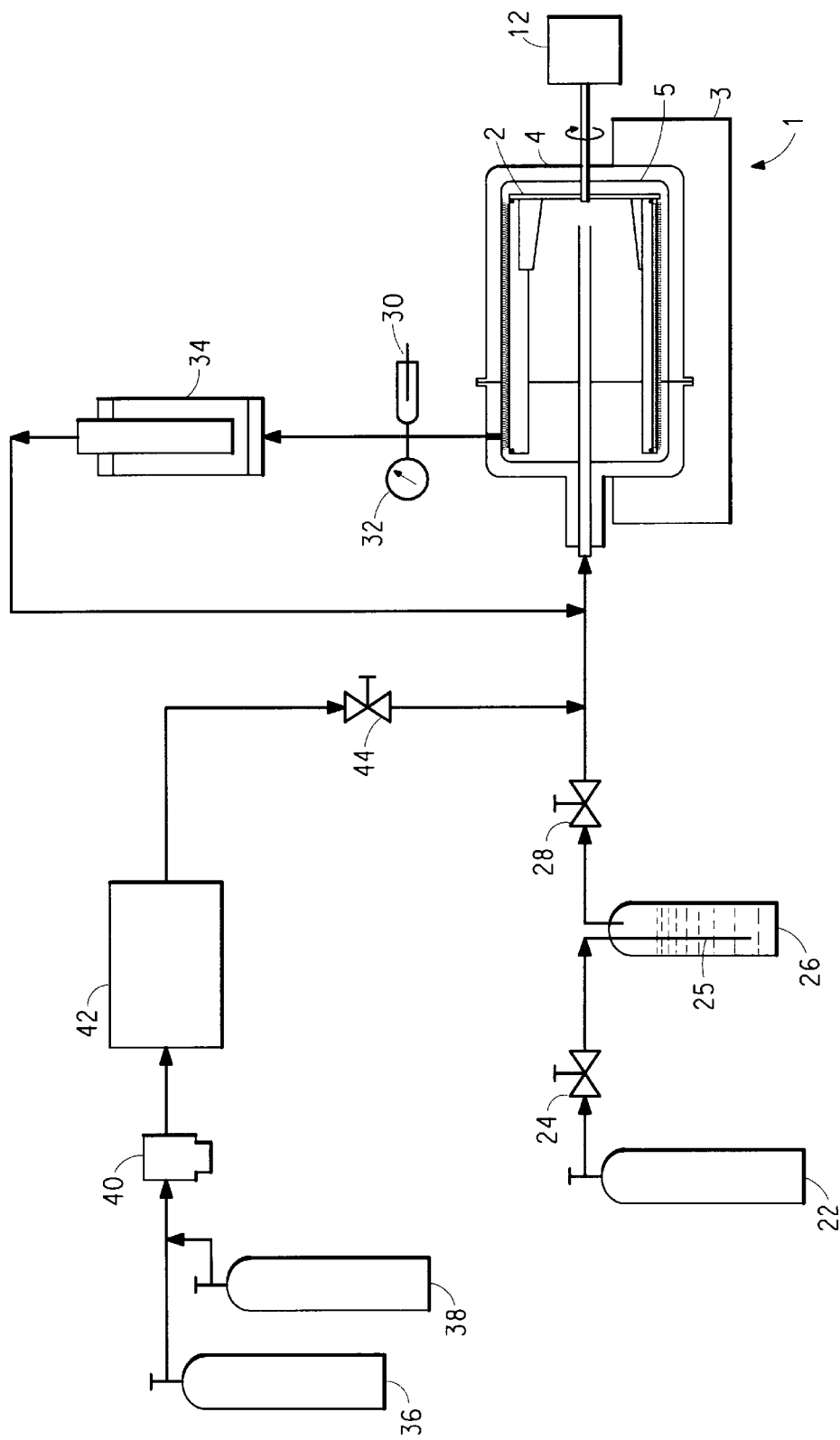
FIG. 2 is a schematic flow chart of the process of the present invention.
Figure 3:
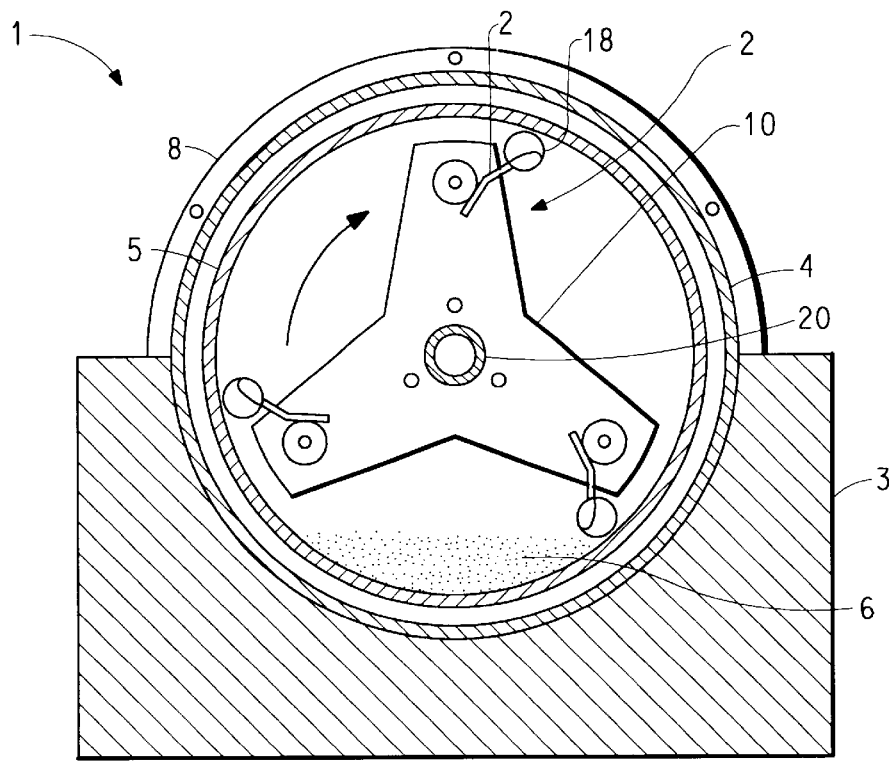
FIG. 3 is a sectional view of reactor assembly used in the process of the present invention taken along a cross section of FIG. 1.
Figure 4:
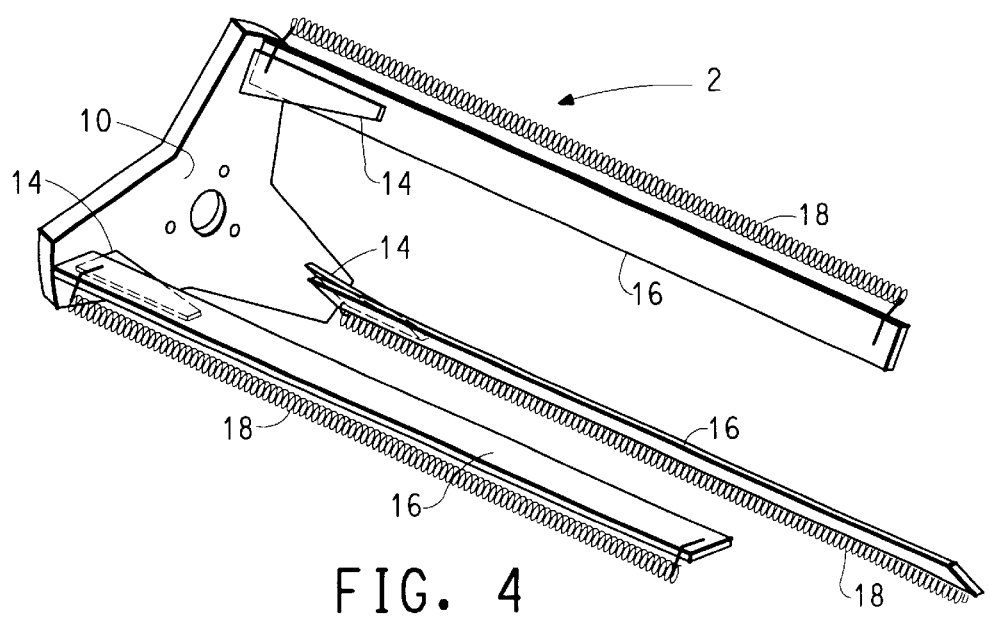
FIG. 4 is a partial exploded view of an agitator assembly.

The additional components used for modifying the pigment particles are shown in FIG. 2. Thus, an oxygen supply 36 is connected to a nitrogen supply 38 to allow the user to generate a nitrogen/oxygen mixture of a desired proportion, which is then conveyed, after passing through a conventional molecular sieve filter 40 to a conventional ozone generator 42, such as model No. GL-1 supplied by PCI-Wedco, West Caldwell, N.J. are well suited for use in the present invention. The ozone/nitrogen mixture produced by ozone generator 42 is conveyed to reactor 5 after passing through a regulator valve 44.

In operation, reactor 5 is loaded with pigment particles that are yet to be modified and sealed sufficiently to prevent contact with air. Flange 10 is rotated at a rate sufficient to deagglomerate the pigment particles. Generally, RPM is adjusted to about the same rate as described earlier. Regulator valve 28 is closed, valve 44 is opened and a desired gas mixture of oxygen and nitrogen, respectively supplied by oxygen supply 36 and nitrogen supply 38 is conveyed to ozone generator 42, while the generation of ozone is still switched off. Generally, the ratio by weight of oxygen to total gas ranges from about 0.8 to 1 preferably from about 0.9 to about 1 and more preferably from about 0.95 to about 0.995. Reactor 5 is preferably operated at ambient pressure. However, if desired, reactor 5 can be operated at a gage pressure ranging from about 6.9 to 689.5 kPa (1 to 100 psi), preferably from about 34.5 to 344.7 kPa (5 to 50 psi), more preferably from 69.0 to 206.8 kPa (10 to 30 psi).

The volumetric flow rate in liter per minute of the gas generally varies in the range of from about 0.1 to 20, preferably from about 1 to 10 and more preferably from about 2 to 6. Once system equilibrium is attained, the ozone generator is switched on to generate ozone, which is then conveyed to reactor 5 for modifying the surfaces of pigment particles. Depending upon the type of pigment particles being modified, the amount of pigment particles loaded in reactor 5, the oxygen/nitrogen ratio, and the duration of exposure of the pigment particles to ozone, the reactor conditions are adjusted to achieve a desired oxygen carbon ratio and pH.

For example, for carbon black pigment suitable for use in the ink jet ink is modified, the reactor conditions are adjusted to attain an oxygen to carbon ratio on the surfaces of the modified pigment in the range of about 0.05 to 1, preferably 0.06 to 0.8 and more preferably 0.1 to 0.6. The reactor conditions for carbon black pigment are also typically adjusted to attain surface pH of the modified pigment particles in the range of from about 0.1 to about 8, preferably about 0.1 to about 4, more preferably about 0.1 to about 1.

Once the step of surface modification is completed, valve 44 is closed and valve 28 is opened to permit the aqueous vapor conveyed to reactor 5 in the manner described above to complete the stabilization of the modified pigment particles.

If desired, reactor 5 may be heated or cooled by including a conventional heat exchanger in supporting block 3.

Suitable organic pigments that can be conditioned according to the process of the present invention include perylene, phthalocyanine, indanthrone, isoindoline, and quinacridone pigments, as well as other known organic pigments. Mixtures, including solid solutions, of such pigments are also suitable.

Peryienes, particularly the diimides and dianhydrides of perylene-3,4,9,10-tetracarboxylic acid, are particularly suitable organic pigments. Suitable perylene pigments can be unsubstituted or substituted, for example, with one or more alkyl, alkoxy, halogens such as chlorine, or other substituents typical of perylene pigments, including those substituted at imide nitrogen atoms with chemically reasonable groups such as alkyl. Crude perylenes can be prepared by methods known in the art. E.g., W. Herbst and K. Hunger, Industrial Organic Pigments (N.Y.: VCH Publishers, Inc., 1993), pages 9 and 467–475, H. Zollinger, Color Chemistry (VCH Verlagsgessellschaft, 1991), pages 227–228 and 297–298, and M. A. Perkins, "Pyridines and Pyridones" in The Chemistry of Synthetic Dyes and Pigments, ed. H. A. Lubs (Malabar, Fla.: Robert E. Krieger Publishing Company, 1955), pages 481–482.

Phthalocyanine pigments, especially metal phthalocyanines, are also suitable organic pigments. Although copper phthalocyanines are preferred, other metal-containing phthalocyanine pigments, such as those based on zinc, cobalt, iron, nickel, and other such metals, may also be used. Metal-free phthalocyanines are also suitable but are generally less preferred. Phthalocyanine pigments can be unsubstituted or partially substituted, for example, with one or more alkyl, alkoxy, halogens such as chlorine, or other substituents typical of phthalocyanine pigments. Crude phthalocyanines can be prepared by any of several methods known in the art but are preferably prepared by a reaction of phthalic anhydride, phthalonitrile or derivatives thereof with a metal donor, a nitrogen donor (such as urea or the phthalonitrile itself, and an optional catalyst, preferably in an organic solvent. E.g., W. Herbst and K. Hunger, Industrial Organic Pigments (N.Y.: VCH Publishers, Inc., 1993), pages 418–427, H. Zollinger, Color Chemistry (VCH Verlagsgessellschaft, 1991), pages 101–104, and N. M. Bigelow and M. A. Perkins, "Phthalocyanine Pigments" in The Chemistry of Synthetic Dyes and Pigments, ed. H. A. Lubs (Malabar, Fla.: Robert E. Krieger Publishing Company, 1955), pages 584–587; see also U.S. Pat. Nos. 4,158,572, 4,257,951, and 5,175,282 and British Patent 1,502,884.

Suitable pigments also include indanthrone pigments prepared by methods known in the art. E.g., W. Herbst and K. Hunger, Industrial Organic Pigments (N.Y.: VCH Publishers, Inc., 1993), pages 498–500; H. Zollinger, Color Chemistry (VCH Verlagsgessellschaft, 1991), pages 219–220 (see also page 237); and M. S. Whelen, "Anthraquinoneazines" in The Chemistry of Synthetic Dyes and Pigments, ed. H. A. Lubs (Malabar, Fla.: Robert E. Krieger Publishing Company, 1955), pages 512–522. Indanthrone pigments can be unsubstituted or partially substituted, for example, with one or more alkyl, alkoxy, halogens such as chlorine, or other substituents typical of indanthrone pigments. Underivatized indanthrone (Pigment Blue 60 or, alternatively, Vat Blue 4) is particularly preferred.

Isoindoline pigments, which can optionally be symmetrically or unsymmetrically substituted, are also suitable organic pigments and can be prepared by methods known in the art. E.g., W. Herbst and K. Hunger, Industrial Organic Pigments (N.Y.: VCH Publishers, Inc., 1993), pages 398–415. A particularly preferred isoindoline pigment, Pigment Yellow 139, is a symmetrical adduct of iminoisoindoline and barbituric acid precursors.

Quinacridone pigments are also suitable organic pigments. Quinacridones (which, as used herein, includes unsubstituted quinacridone, quinacridone derivatives, and solid solutions thereof) can be prepared by any of several methods known in the art but are preferably prepared by thermally ring-closing various 2,5-dianilinoterephthalic acid precursors in the presence of polyphosphoric acid. E.g., S. S. Labana and L. L. Labana, "Quinacridones" in Chemical Review, 67, 1–18 (1967), and U.S. Pat. Nos. 3,157,659, 3,256,285, 3,257,405, and 3,317,539. Suitable quinacridone pigments can be unsubstituted or substituted (for example, with one or more alkyl, alkoxy, halogens such as chlorine, or other substituents typical of quinacridone pigments).

Other suitable organic pigments include dioxazines (that is, triphenedioxazines), 1,4-diketopyrrolopyrroles, anthrapyrimidines, anthanthrones, flavanthrones, indanthrones, perinones, pyranthrones, thioindigos, 4,4'-diamino-1,1'-dianthraquinonyl, and azo compounds, as well as substituted derivatives thereof.

An amount of the hydrophilic functional groups is not defined in a wholesale manner, because it depends upon the types of the hydrophilic group, and upon the types of salt when the functional group forms a salt. In a case where the hydrophilic group is a $—COO^-M^+$ group, the amount of the hydrophilic functional groups is desirably from 0.4 to 5 mmol/g. The $M^+$ represents the counter ions such as lithium, sodium, potassium, cesium, or amines.

Any inorganic and organic pigments may be used as the pigment into which the hydrophilic functional group is introduced.

As a black pigment, a carbon black pigment such as furnace black, lamp black, acetylene black and channel black is preferable. Examples of compounds which may be used as the black pigment, may include, but are not limited to, Raven 7000, Raven 5750, Raven 5250, Raven 5000 ULTRA, Raven 3500, Raven 2500 ULTRA, Raven 2000, Raven 1500, Raven 1255, Raven 1250, Raven 1200, Raven 1190 ULTRA, Raven 1170, Raven 1080 ULTRA, Raven 1060 ULTRA, Raven 790 ULTRA, Raven 780 ULTRA and Raven 760 ULTRA (manufactured by Colombian Chemicals Co.); Regal 1400R, Regal 1330R, Regal 1660R, Mogul L, Monarch 700, Monarch 800, Monarch 880, Monarch 900, Monarch 1000, Monarch 1100, Monarch 1300 and Monarch 1400 (manufactured by Cabot); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (manufactured by Degussa Corp.); No. 25, No. 33, No. 40, No. 47, No. 52, No. 900, No. 2300, MCF-88, MA 600, MA 7, MA 8 and MA 100 (manufactured by Mitsubishi Chemical Corp.). Magnetic microparticles such as magnetite or ferrite; titanium black; or the like may be used as the black pigment.

Examples of a cyan color pigment may include, but are not limited to, C.I. Pigment Blue-1, C.I. Pigment Blue-2, C.I. Pigment Blue-3, C.I. Pigment Blue-15, C.I. Pigment Blue-15:1, C.I. Pigment Blue-15:3, C.I. Pigment Blue-15:34, C.I. Pigment Blue-16, C.I. Pigment Blue-22 and C.I. Pigment Blue-60.

Examples of a magenta color pigment may include, but are not limited to, C.I. Pigment Red 5, C.I. Pigment Red 7, C.I. Pigment Red 12, C.I. Pigment Red 48, C.I. Pigment Red 48:1, C.I. Pigment Red 57, C.I. Pigment Red 112, C.I. Pigment Red 122, C.I. Pigment Red 123, C.I. Pigment Red 146, C.I. Pigment Red 168, C.I. Pigment Red 184 and C.I. Pigment Red 202.

Examples of a yellow color pigment may include, but are not limited to, C.I. Pigment Yellow-1, C.I. Pigment Yellow-2, C.I. Pigment Yellow-3, C.I. Pigment Yellow-12, C.I. Pigment Yellow-13, C.I. Pigment Yellow-14, C.I. Pigment Yellow-16, C.I. Pigment Yellow-17, C.I. Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-151 and C.I. Pigment Yellow-154.

Pigments with specific colors including a red, green, blue, brown and white color, pigments with metallic and glossy colors such as silver and gold, colorless extender pigments, or plastic pigments other than pigments with a black color and three primary colors, namely, a cyan color, magenta color and yellow color may be used. Also, pigments which are newly synthesized for the present invention may be used.

Examples of suitable pigments include Metallized Azo Reds such as Red 49:1 (Barium salt), Red 49:2 (Calcium salt), Red 63:1 (Calcium salt), Toluidine Reds, Naphthol Reds, Pyrazalones, Rhodamines, Quinacridones such as Red B, Red Y, Magenta B, Magenta and Violet, Phthalocyanine Blues, Phthalocyanine Greens, Carbazole Yellow, Monoarylide Yellow, Diarylide Yellow, Chrome Yellow, Red Lake C, Lithol Reds such as calcium and barium salts, Lithol Rubine, Bon Maroon, Perylene pigments, Red 2B pigments including the calcium, barium and magnesium salts, Chrome yellow, Chrome Orange, Molybdate Orange, Lead Chromes, Lead Silicochromates, Zinc Chromes, barium chromate, strontium chromate, titanium nickel yellow, Liminites, Haematite, Magnetite, Micaceous Oxides of Iron, Siderite, Iron Pyrites, Ferrite Yellow, Red Oxide, Prussian Blue, Orange 36, Diarylide Orange, Dianisidine Orange, Tolyl Orange, and Dinitraniline Orange. Other suitable examples of pigments include lakes, for instance, lakes formed from acid dyes and alkali or alkaline earth metals. Examples of acid dyes suitable for forming such lakes include Peacock Blue, Scarlet 2R, Azo Bordeaux, Pigment Scarlet 3B, Orange 2, and Tartrazine. Carbon black is a preferred colorant for use in digital duplicator ink formulations of the instant invention. Carbon black colorant includes Channel black, furnace black, and lamp black. Other examples of suitable pigments include hiding pigments such as titanium dioxide-anatase and rutile, zinc oxide, zinc sulfide, and lithopone.

The colorants suitable for use in the ink of the present invention may have a wide range of particle sizes as from about 0.01 microns to about 100 microns, preferably from about 0.02 microns to about 50 microns, and more preferably from 0.01 microns to 10 microns.

The present invention is also directed to an ink jet ink composition that includes the stabilized pigment particles if the present invention. The ink jet ink includes water, an aqueous organic solvent, a surfactant and a self-dispersible stabilized pigment particles if the present invention, wherein the number average particle diameter of dispersed particles of the pigment is from 15 to 200 nm. The ink composition of the present invention may additionally include pH adjusting agents, humectants, biocides, defoamers. Any suitable ink carrier, including aqueous and nonaqueous carriers, can be used in the preparation of the ink composition of the present invention. Water is a preferred ink carrier, however any suitable amount of ink carrier can be used. Typically the carrier is used in an amount of from about 30% weight to about 80% by weight, preferably in an amount of from about 40% by weight to about 70% weight of the composition. When water is used as the carrier, in order to prevent the clogging of ink jet tip by the dissolved salts present in the water, it is preferred that deionized water is used in the preparation of the ink composition.

The ink composition of the present invention can preferably include a humectant to prevent drying of the ink during the printing operation, as well as during storage of the ink. Humectants are hydrophilic solvents having high boiling points, preferably above 100° C., more preferably in the range of from about 150° C. to about 250° C. Any suitable humectant known to those of ordinary skill in the art can be used. Examples of suitable humectants include glycols, such as ethylene glycol, propylene glycol, glycerin, diglycerin, diethylene glycol; glycol ethers, such as ethylene glycol dimethyl ether, ethylene glycol diethylether, cellosolve, diethylene glycol monoethylether (Carbitol), diethylene glycol dimethylether, and diethylene glycol diethylether; dialkyl sulfoxides, such as dimethyl sulfoxide; and other solvents such as sulfolane and N-methyl pyrrolidinone. Propylene glycol and N-methyl pyrrolidinone are preferred humectants. Any suitable amount of the humectant can be used, preferably in an amount of from about 0.5% by weight to about 5% by weight of the ink composition, and more preferably in the amount of from about 1% by weight to about 3% by weight of the ink composition.

The ink composition of the present invention can preferably include a suitable biocide to prevent growth of bacteria, mould or fungus. Any suitable biocide can be used. DOWICIL™. 150, 200, and 75, benzoate salts, sorbate salts, methyl p-hydroxybenzoate (Methyl Paraben) and 6-acetoxy-2,2-dimethyl-1,3-dioxane (available as Giv Gard DXN from Givaudam Corp.) are examples of suitable biocides, with Giv Gard DXN being a preferred biocide. The biocide-can be present in the ink of the instant invention in an amount sufficient to prevent the attack by bacteria, mould, and fungus, which amount can be in the range of from about 0.05% by weight to about 0.5% by weight, preferably in the amount of from about 0.1% by weight of to about 0.3% by weight of the ink composition.

The ink composition of the present invention can preferably include a defoamer to prevent foaming of the ink during its preparation, as well as during the printing operation. Any suitable defoamer known to those of ordinary skill in the art can be used, preferably those that are miscible with water. Suitable defoamers include silicone defoamers and acetylenic defoamers. Examples of commercially available defoamers include silicone defoamers, such as DC-150, which can be obtained from Dow Corning Co., and SILVET I-77, 720, 722, or 7002, which can be obtained from Union Carbide Co. A preferred defoamer is XRM-3588E.TM., which can be obtained from Ultra Additives Inc., in Paterson, N.J. XRM-3588E is a defoamer generally used in metal cutting fluids, and has a Brookfield (RVF Spindle #4, 20 RPM, 25° C.) viscosity of 6,000 to 9,000 centipoises, a specific gravity of 0.984–1.032, and a pH of 7.0–8.5 (50% solution). The chemistry of XRM-3588E has not been published, and is believed to be a silicone defoamer. U.S. Pat. No. 5,596,027 is incorporated herein by reference.

The stabilized particles of the present invention are also well suited for use in pigmented waterborne and solvent borne coating compositions, such as in (OEM and refinish) automotive coatings compositions, architectural coatings, industrial coatings. The stabilized particles of the present invention are equally well suited for use in pigmented powder coating compositions.

EXAMPLES

Example 1

200 grams of FW-18 carbon black pigment supplied by Degusa were modified by exposure to 2% ozone in dry oxygen (20%) and argon fed at a rate of 5 liters per minute though reactor 5, shown in FIG. 1, for 48 hours. The modified pigment particles were loaded in reactor 5 having three rotating vanes 10 that wiped the reactor inner wall to deagglomerate the modified pigment particles. Vanes 10 rotated 10 seconds out of every 5 minutes. Argon used as a carrier gas was bubbled though bubbler 25 containing water. Water was entrained in argon and then fed to reactor 5 at a rate of 5 liters per minute for 100 minutes. When the stabilized pigment particles were removed from reactor 5 and exposed to air, no exothermic event occurred. Approximately 5 grams of water had been delivered to the reactor via the argon feed gas. The pH was 0.98, 10% pigment in water by weight, compared to 4–5 for untreated pigment. XPS (x-ray photoelectron spectroscopy) of the stabilized pigment particle (post treatment) showed surface oxygen to carbon ratio of 0.61, compared to 0.03 before the treatment. XPS is a method for measuring the atomic content of the top 10 nanometers of a surface.

Example 2

200 grams of Printex 150T carbon black pigment supplied by Deguesa were modified by exposure to 2% ozone in dry oxygen (20%) and argon fed at a rate of 5 liters per minute though a reactor for 48 hours. The modified pigment particles were loaded in reactor 5 having three rotating vanes 10 that wiped the reactor inner wall to deagglomerate the modified pigment particles. Vanes 10 rotated 10 seconds out of every 5 minutes. Argon used as a carrier gas was bubbled though bubbler 25 containing water. Water entrained argon was fed to reactor 5 at a rate of 5 liters per minute for 5.3 hours. When the stabilized pigment particles were removed from reactor 5 and exposed to air, no exothermic event occurred. Approximately 12 grams of water had been delivered to the reactor via the argon feed gas. The pH was 1.6, 10% pigment in water by weight, compared to 3.9 for untreated pigment. XPS (x-ray photoelectron spectroscopy) of the stabilized pigment particle (post treatment) showed surface oxygen to carbon ratio of 0.34, compared to 0.06 before the treatment.

Comparative Example 1

217 grams of Printex 150T carbon black pigment supplied by Deguesa were modified by exposure to 2.1% ozone in dry oxygen (20%) and argon fed at a rate of 5 liters per minute though reactor 5 for 67.5 hours. The pigment particles were loaded in reactor 5 having three rotating vanes 10 that wiped the reactor inner wall to deagglomerate the modified pigment particles. Vanes 10 rotated 10 seconds out of every 5 minutes. The temperature in reactor 5 during the surface modification did not exceed 60° C. Once the pigment particle modification was completed, the particles were poured out of reactor 5 into a paint can. Upon sitting undisturbed, the surface modified pigment particles underwent an exothermic event. The reaction was violent enough to discharge the surface modified pigment particles out of the can with some force. The remaining particles in the can were glowing red and upon cooling turned to ash. The temperature of the powder in the can exceeded 300° C. The pH of the particles (post treatment, pre-exotherm) in 10% by weight in deionized water reached 0.1 as compared to 3.9 before treatment. XPS (x-ray photoelectron spectroscopy) of the particles (post treatment, pre exotherm) showed surface oxygen to carbon ratio of 0.48 as compared to 0.06 before treatment.

Comparative Example 2

105 grams of FW-18 carbon black pigment supplied by Deguesa were modified by exposure to 1.7% ozone in dry oxygen (20%) and argon fed at a rate of 5 liters per minute though a reactor for 48 hours. The temperature in reactor 5 during the surface modification did not exceed 40° C. The pigment particles were loaded in reactor 5 having three rotating vanes 10 that wiped the reactor inner wall to deagglomerate the modified pigment particles. Vanes 10 rotated 10 seconds out of every 5 minutes. Once the pigment particle modification was completed, the particles were poured out of reactor 5 into a paint can. Upon sitting undisturbed, the surface modified pigment particles underwent an exothermic event. The temperature of the powder in the can exceeded 200° C. Post exothermic pH of pigment particles at 10% pigment in deionized water by weight was 2.29 as compared to 4–5 for untreated particles.

What is claimed is:

1. A method of producing stabilized organic pigment particles, said method comprising:
    surface modifying organic pigment particles;
    contacting said surface modified particles with an aqueous vapor entrained in a carrier gas to produce said stabilized organic pigment particles.

2. The method of claim 1 wherein the stabilized organic pigment particles have a surface oxygen to carbon ratio of about 0.05 to 1.

3. The method of claim 1 wherein said carrier gas is argon, nitrogen, helium, neon, carbon dioxide, air or a mixture thereof.

4. The method of claim 1, 2 or 3 wherein weight of said aqueous vapor entrained in said carrier gas ranges from 10 to 500 micrograms per square meter of pigment surface area.

5. The method of claim 1 wherein said contacting step is accompanied by deagglomeration of said surface modified particles to increase exposure of said surface modified particles to said aqueous vapor.

6. The method of claim 1, 2, 3 or 5 wherein surface pH of said stabilized particles is 0.1 to 8.

7. The method of claim 1 wherein said particles are surface modified by exposing surfaces of said particles to a plasma-activated process gas.

8. The process of claim 6 wherein said process gas is selected from the group consisting of oxygen, nitrogen, water vapor, hydrogen peroxide, carbon dioxide, ammonia, ozone, carbon monoxide, trimethylsilane, tetraetoxysilane, hexamethyldisiloxane, ethylene diamine, maleic anhydride, arylamine, acetylene, methane, ethylene oxide, hydrogen, styrene, air, sulfur dioxide, sulfonyl precursors, phosphonyl precursors, alcohols, and a mixture thereof.

9. The method of claim 1 wherein said particles are surface modified by exposing surfaces of said particles to ozone.

10. The method of claim 1 wherein said organic pigment particles comprise carbon black, diketo-pyrrolopyrrole red pigment, perylene maroon pigment, polybutadiene, polychloroprene, polyethylene, polypropylene, polyacrylonitirle, polymethacrylic acid, polyvinyl acetate, polyvinyl chloride, cellulose, copper phthalocyanine blue pigment 15:2,3,4, polychloro copper phthalocyanine, C.I. pigment green 7, quinacridone red pigment, quinacridone violet, copper phthalocyanine blue, C.I. Pigment Yellow-17, C.I. Pigment Yellow-74, C.I. Pigment Yellow-83, C.I. Pigment Yellow-95, C.I. Pigment Yellow-128, C.I. Pigment Yellow-151 or C.I. Pigment Yellow-154.

11. Stabilized organic pigment particles produced in accordance with the method of claim 1.

12. Ink jet ink composition comprising stabilized organic pigment particles produced in accordance with the method of claim 1.

13. A coating composition comprising stabilized organic pigment particles produced in accordance with the method of claim 1.

* * * * *